(12) United States Patent (10) Patent No.: US 12,487,148 B2
Hwang (45) Date of Patent: Dec. 2, 2025

(54) PORTABLE MODEL EYE APPARATUS FOR INTRAOCULAR LENS EVALUATION

(71) Applicant: THE CATHOLIC UNIVERSITY OF KOREA INDUSTRY-ACADEMIC COOPERATION FOUNDATION, Seoul (KR)

(72) Inventor: Hosik Hwang, Seoul (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 138 days.

(21) Appl. No.: 18/377,499

(22) Filed: Oct. 6, 2023

(65) Prior Publication Data
US 2024/0118164 A1 Apr. 11, 2024

(30) Foreign Application Priority Data
Oct. 6, 2022 (KR) .................. 10-2022-0127515

(51) Int. Cl.
 *G01M 11/02* (2006.01)
 *A61B 90/00* (2016.01)
 *A61F 2/16* (2006.01)
(52) U.S. Cl.
 CPC ......... *G01M 11/0257* (2013.01); *A61B 90/06* (2016.02); *A61F 2/16* (2013.01)
(58) Field of Classification Search
 CPC .... G01M 11/0257; A61B 90/06; A61B 34/10; A61B 2034/104; A61B 2034/108;
(Continued)

(56) References Cited

U.S. PATENT DOCUMENTS 7,688,431 B1 3/2010 Balch et al.
10,285,582 B1 * 5/2019 Kavusi ................ A61B 3/1015
(Continued)

FOREIGN PATENT DOCUMENTS

KR 102153451 B1 * 9/2020 ............. A61B 34/10

OTHER PUBLICATIONS

Office Action in corresponding Korean Application No. 10-2022-0127515, dated Oct. 22, 2024 (14 pages).

*Primary Examiner* — Thanh Luu
*Assistant Examiner* — Mai Thi Ngoc Tran
(74) *Attorney, Agent, or Firm* — Osha Bergman Watanabe & Burton LLP (57) ABSTRACT

Disclosed is a portable model eye apparatus for intraocular lens evaluation that enables more accurate comparison of intraocular lenses by capturing the same image and situation for different intraocular lenses. A portable model eye apparatus for intraocular lens evaluation according to an aspect of the present invention may include a beam splitter configured to emit an incident light source in two directions at right angles to each other; a pair of corneal modules including a first corneal module and a second corneal module disposed in a first emission direction and a second emission direction of a light source, respectively; a pair of intraocular lens modules including a first intraocular lens module disposed behind the first corneal module along the first emission direction, and a second intraocular lens module disposed behind the second corneal module along the second emission direction; and a pair of camera modules disposed behind the pair of intraocular lens modules, respectively, to obtain images emitted.

8 Claims, 7 Drawing Sheets

(58) Field of Classification Search
CPC .... A61F 2/16; A61F 2240/008; A61F 2/1618; G03B 17/02; H04N 23/50
See application file for complete search history.

(56) References Cited

U.S. PATENT DOCUMENTS

2006/0200941 A1* 9/2006 Kim .................... H04M 1/0216
  16/221
2009/0036898 A1* 2/2009 Ichinohe ............... A61F 2/1678
  606/107

* cited by examiner

【FIG. 8】

PORTABLE MODEL EYE APPARATUS FOR INTRAOCULAR LENS EVALUATION

CROSS-REFERENCE TO RELATED APPLICATION

This application claims priority to and the benefit of Korean Patent Application No. 10-2022-0127515, filed on Oct. 6, 2022, the disclosure of which is incorporated herein by reference in its entirety.

TECHNICAL FIELD

The present invention relates to a portable model eye apparatus for intraocular lens evaluation, and more particularly, to a portable model eye apparatus for intraocular lens evaluation that enables more accurate comparison of intraocular lenses by capturing the same image and situation for intraocular lenses with different powers.

BACKGROUND

In general, during cataract surgery, the cloudy lens is removed and an intraocular lens (IOL) is inserted. Recently, not only general monofocal intraocular lens but also multifocal intraocular lens have been widely used. When a multifocal intraocular lens is inserted, it is said that both distant and near objects can be seen clearly.

However, there is no way to objectively evaluate how a patient with a multifocal intraocular lens actually sees the world. There is a method of inserting a multifocal intraocular lens into a model eye in an optical laboratory and testing it using a standardized visual target, but since this is different from the actual environment, there is a problem in that it is difficult to deliver the simulated postsurgical information to patients.

To solve this problem, a portable model eye apparatus was developed. The portable model eye apparatus has an advantage of being portable and can accurately convey visual information to patients after surgery in various places and environments.

However, the model eye apparatus according to the related art was difficult to compare because it could not capture distant or near objects or night distances in the exact same way when comparing intraocular lens A and intraocular lens B. In other words, there was a problem in that different intraocular lenses could not be compared because it was impossible to create the same situation for each A and B intraocular lens and film it with a camera.

SUMMARY OF THE INVENTION

Technical Problem

The present invention is to solve the above problems, and the present invention is directed to providing a portable model eye apparatus for intraocular lens evaluation that allows for more accurate comparison of intraocular lenses with different powers by combining a beam splitter dividing a light source and two portable model eye apparatuses to capture distant or near objects or night distances in the exact same way for two intraocular lenses.

The problems of the present invention are not limited to those mentioned above, and other problems not mentioned will be clearly understood by those of ordinary skill in the art from the following description.

Technical Solution

According to an aspect of the present invention, provided is a portable model eye apparatus for intraocular lens evaluation, including a beam splitter configured to emit an incident light source in two directions at right angles to each other; a pair of corneal modules comprising a first corneal module and a second corneal module disposed in a first emission direction and a second emission direction of a light source, respectively; a pair of intraocular lens modules comprising a first intraocular lens module disposed behind the first corneal module along the first emission direction, and a second intraocular lens module disposed behind the second corneal module along the second emission direction; and a pair of camera modules disposed behind the pair of intraocular lens modules, respectively, to obtain images emitted.

In this case, intraocular lenses of the first intraocular lens module and the second intraocular lens module may have different powers.

In this case, the pair of intraocular lens modules may include a main body having a through hole formed therein; an intraocular lens mounted to be fixed inside the through hole of the main body; a window member fixed at upper and lower ends of the through hole of the main body so that the inside of the through hole of the main body is sealed and made of a transparent material; a fixing part that fixes the position of the intraocular lens; and an aqueous liquid filled inside the through hole.

In this case, the cross-section of the through hole may be formed in a circular shape.

In this case, the central axis of the intraocular lens may be disposed on the central axis of the through hole.

In this case, the fixing part may include an upper fixing adapter and a lower fixing adapter installed on upper and lower parts of the intraocular lens to fix the intraocular lens at a certain height inside the through hole.

In this case, an assembling jaw having a reduced diameter may be formed at a lower end of the through hole of the main body, and the lower fixing adapter, the intraocular lens, and the upper fixing adapter may be sequentially stacked over the assembling jaw.

In this case, upper and lower cases in which the beam splitter, the pair of intraocular lens modules, and the pair of camera modules are arranged at right angles may be further included, and the upper and lower cases may be provided with seating parts along a right angle direction.

In this case, the seating part may have a slot, and a stopper for fixing the position of the pair of intraocular lens modules may be installed in the slot.

In this case, the stopper may be partially inserted into the main body of the pair of intraocular lens modules, respectively, to fix the position.

In this case, an elastic means may be installed between the pair of camera modules and the pair of intraocular lens modules, and the stopper may be installed on the opposite side of the elastic means so that the main body of the pair of intraocular lens modules are respectively caught and stopped.

Advantageous Effects

According to the above configuration, the portable model eye apparatus for intraocular lens evaluation according to an exemplary embodiment of the present invention, in a por-

DETAILED DESCRIPTION OF THE EMBODIMENTS

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention, and throughout the specification, same or similar reference numerals denote same elements.

Terms and words used in the present specification and claims should not be construed as limited to their usual or dictionary definition, and they should be interpreted as a meaning and concept consistent with the technical idea of the present invention based on the principle that inventors may appropriately define the terms and concept in order to describe their own invention in the best way.

Accordingly, the embodiments described in the present specification and the configurations shown in the drawings correspond to preferred embodiments of the present invention, and do not represent all the technical idea of the present invention, so the configurations may have various examples of equivalent and modification that can replace them at the time of filing the present invention.

It should be understood that the terms "comprise" or "have" or the like when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, a portable model eye apparatus 10 for intraocular lens evaluation according to an exemplary embodiment of the present invention will be described with reference to the drawings.

Referring to FIGS. 1 to 6, the portable model eye apparatus 10 for intraocular lens evaluation according to an exemplary embodiment of the present invention includes a beam splitter 30, a pair of corneal modules 60, a pair of intraocular lens modules 20 and 50, and a pair of camera modules 40 and 70.

Figure 1:
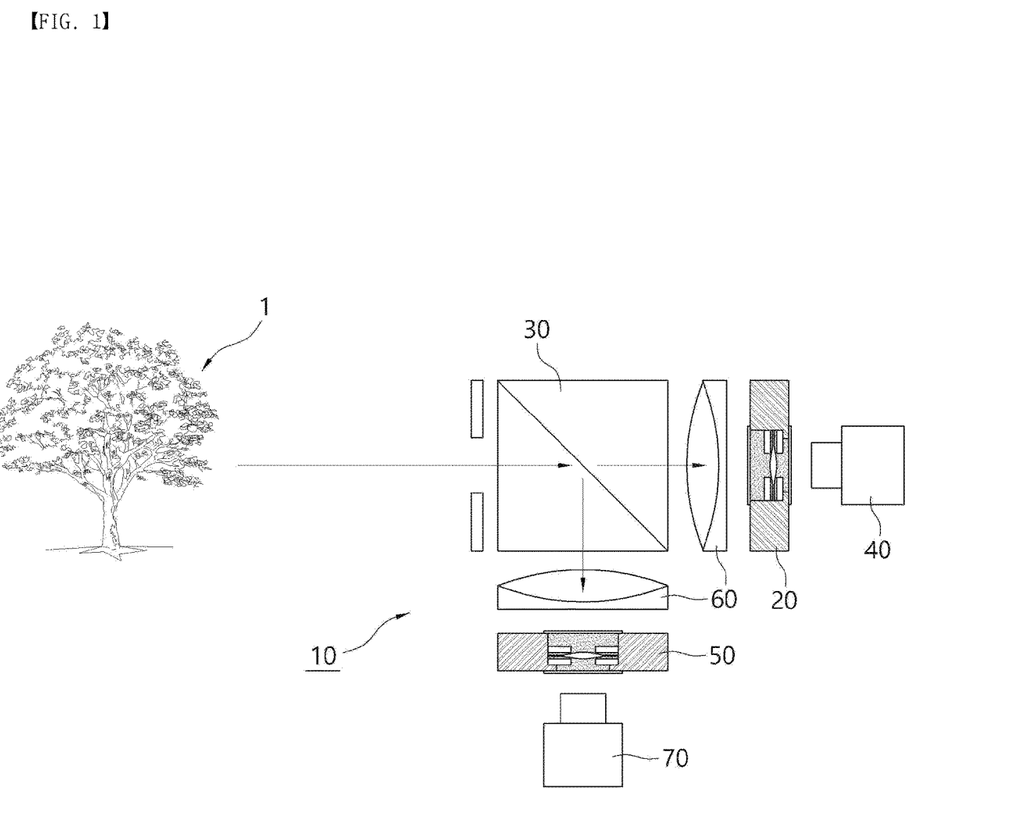
FIG. 1 is a configuration diagram showing a portable model eye apparatus for intraocular lens evaluation according to an exemplary embodiment of the present invention.

Referring to FIG. 1, the beam splitter 30 may emit an incident light source in two directions at right angles to each other.

In this case, the beam splitter 30 refers to a reflector or other optical device that reflects part of the light beam and transmits the other part, and is used in interferometers or the like, and in addition, the operating area of the beam splitter is also to obtain two emitting lights whose vibration directions are perpendicular to each other by utilizing the birefringence of the crystal.

Referring to FIGS. 1 to 6, the pair of corneal modules 60 may include a first corneal module 60 and a second corneal module 60 disposed in the first emission direction and the second emission direction of the light source, respectively.

Referring to FIGS. 1 to 6, the pair of intraocular lens modules 20 and 50 may include a first intraocular lens module 20 disposed behind the first corneal module 60 along the first emission direction, and a second intraocular lens module 50 disposed behind the second corneal module 60 along the second emission direction.

In this case, the intraocular lenses of the first intraocular lens module 20 and the second intraocular lens module 50 may have different powers.

Figure 2:
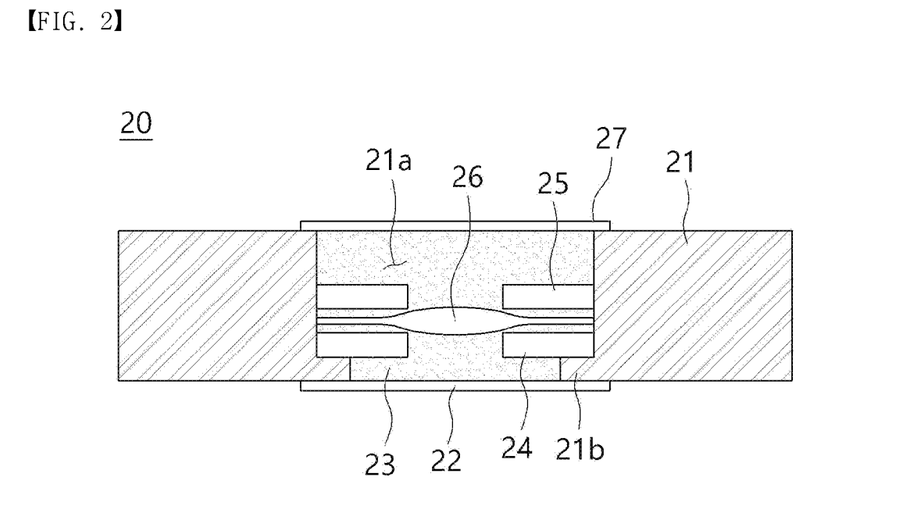
FIG. 2 is a cross-sectional view of an intraocular lens module, which is a component of a portable model eye apparatus for intraocular lens evaluation according to an exemplary embodiment of the present invention.

In this case, referring to FIG. 2, the pair of intraocular lens modules 20 and 50 may include a main body 21, an intraocular lens 26, window members 22 and 27, a fixing part, and an aqueous liquid 23.

Referring to FIG. 2, the main body 21 has a through hole 21a formed in the center in the up and down direction.

In this case, the cross-section of the through hole 21a may be formed in a circular shape.

In this case, the main body 21 may have a substantially flat cylindrical shape. However, the shape of the main body is not limited to a cylindrical shape, and may have a rectangular parallelepiped shape or a polyhedral shape depending on the shape.

In this case, an assembling jaw 21b having a reduced diameter is formed at the lower end of the through hole 21a of the main body 21, and the lower fixing adapter 24, the intraocular lens 26, and the upper fixing adapter 25 are sequentially stacked over the assembling jaw 21b.

Referring to FIG. 2, the intraocular lens 26 is mounted horizontally so as to be fixed inside the through hole 21a of the main body 21. Of course, the intraocular lens 26 is stably fixed and maintained in that state by the upper and lower fixing adapters 24 and 25.

Referring to FIG. 2, the window members 22 and 27 are fixed at upper and lower ends so that the inside of the through hole 21a of the main body 21 is sealed, and made of a transparent material.

In this case, the window members 22 and 27 may be manufactured using glass or synthetic resin panels. In addition, the window members 22 and 27 may be fixed to the main body 21 by being attached to the main body 21 by an adhesive.

Referring to FIG. 2, the fixing part fixes the position of the intraocular lens 26.

In this case, the fixing part is composed of an upper fixing adapter 25 and a lower fixing adapter 24, and the intraocular lens 26 is positioned therebetween to maintain a fixed state. That is, the intraocular lens 26 is positioned between the upper and lower fixing adapters 24 and 25, but is indirectly fixed such that the intraocular lens 26 itself is not fixed to the main body 21 but the upper and lower fixing adapters 24 and 25 are fixed.

In this case, the upper and lower fixing adapters 24 and 25 may be in the form of a flat annular ring like a washer, and a method in which the upper fixing adapter 25 is fixed by tightening the headless bolt from the side, or a method of fixing an annular fixing bolt that is screwed onto the upper fixing adapter 25 may be applied. In addition to these fixing methods, by fixing the upper fixing adapter 25 in various ways, it is possible to stably fix the intraocular lens 26 at a predetermined position inside the main body 21.

The aqueous liquid 23 may be water or physiological saline solution filled inside the through hole 21a.

The pair of camera modules 40 and 70 may be disposed behind the pair of intraocular lens modules 20 and 50, respectively, to obtain images emitted.

In this case, the pair of camera modules 40 and 70 each include a memory card to store image information obtained, and by comparing the images, the results of the first intraocular lens module 20 and the second intraocular lens module 50 may be compared. Of course, in this case, since the images are of the same object taken at the same time, accurate comparison is possible.

Figure 5:
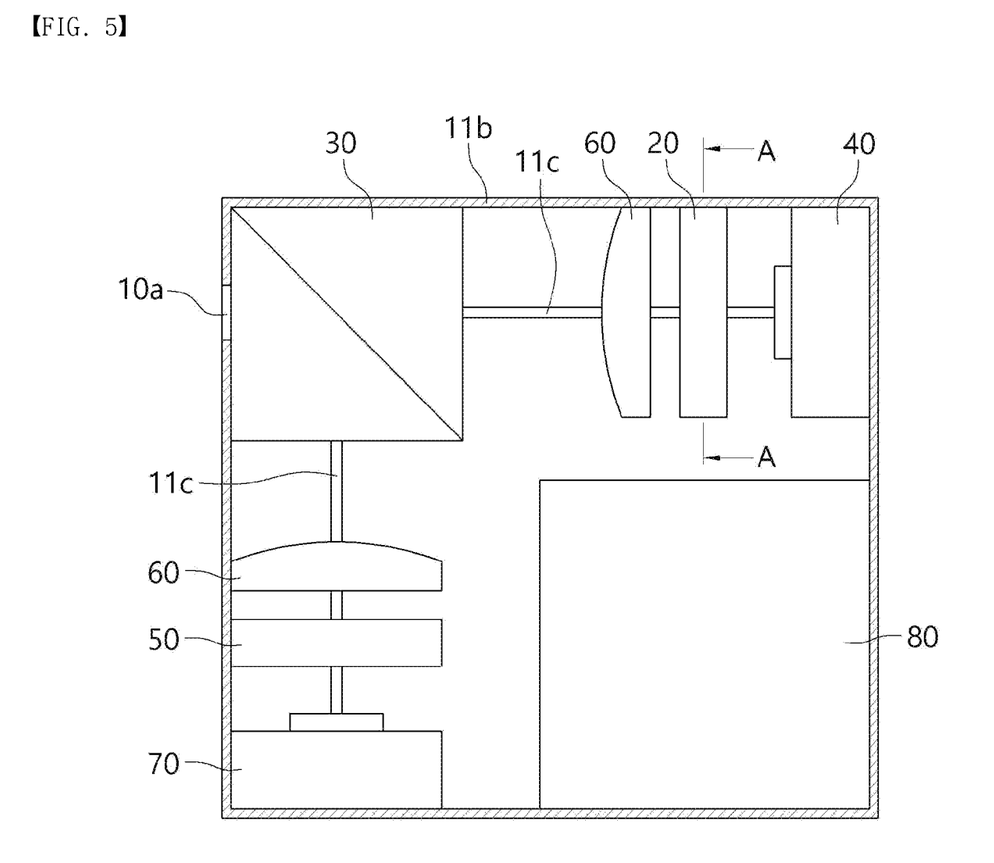
FIG. 5 is a plan view of a lower case of a portable model eye apparatus for intraocular lens evaluation according to an exemplary embodiment of the present invention.

In this case, upper and lower cases 11a and 11b in which the beam splitter 30, the pair of intraocular lens modules 20 and 50, and the pair of camera modules 40 and 70 are arranged at right angles may be included, and the upper and lower cases 11a and 11b may be provided with seating parts 11d along a right angle direction.

Figure 6:
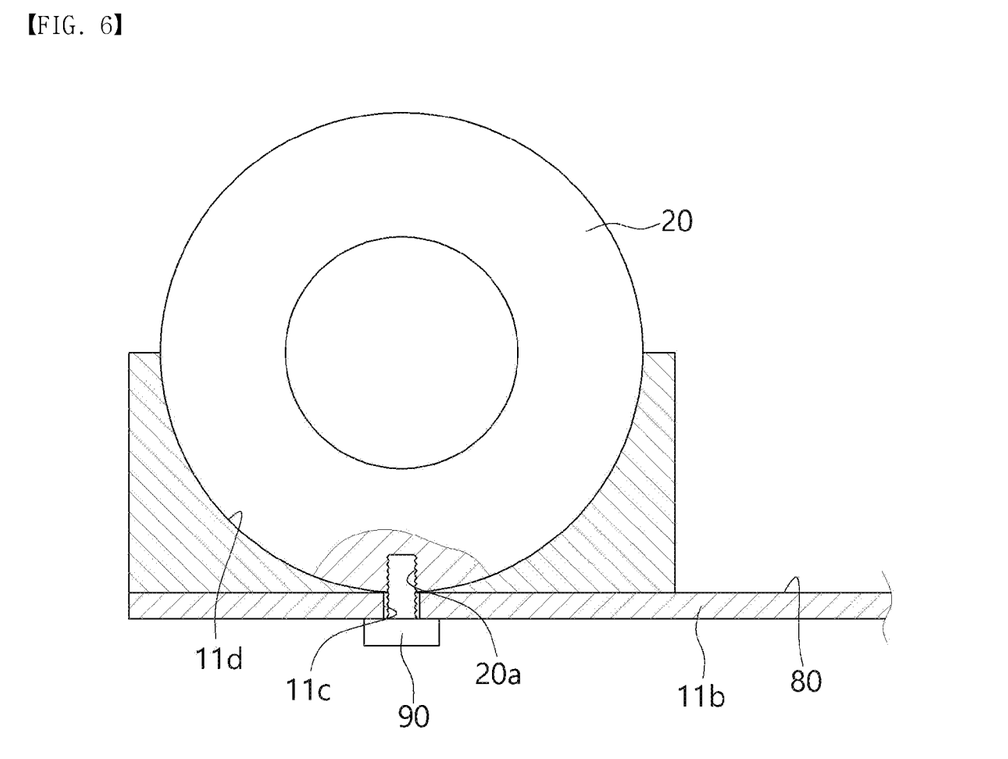
FIG. 6 a cross-sectional view taken along line AA shown in FIG. 5.

In addition, the seating part 11d has a slot 11c, and a stopper 90 for fixing the position of the pair of intraocular lens modules 20 and 50 may be installed in the slot 11c. Here, the stopper 90 may be partially inserted into the main body of the pair of intraocular lens modules 20 and 50, respectively, to fix the position.

Referring to FIG. 1, a configuration diagram showing a portable model eye apparatus 10 for intraocular lens evaluation according to an exemplary embodiment of the present invention is shown. The corneal modules 60, the intraocular lens modules 20 and 50, and the camera modules 40 and 70 are respectively installed in a right angle direction with respect to the beam splitter 30. When filming of an object 1 begins, the light source reflected from the object 1 is separated and emitted in a right angle direction by the beam splitter 30, and is photographed by each camera module 40 and 70 to obtain an image. By comparing the obtained images, it is possible to compare the first intraocular lens and the second intraocular lens, and accordingly, appropriate measures, such as which intraocular lens to adopt, can be taken.

Referring to FIG. 2, a cross-sectional view of an intraocular lens module 20, which is a component of a portable model eye apparatus 10 for intraocular lens evaluation according to an exemplary embodiment of the present invention, is shown. As described above, the pair of intraocular lens modules 20 may include a main body 21, an intraocular lens 26, window members 22 and 27, a fixing part, and an aqueous liquid 23.

Figure 3:
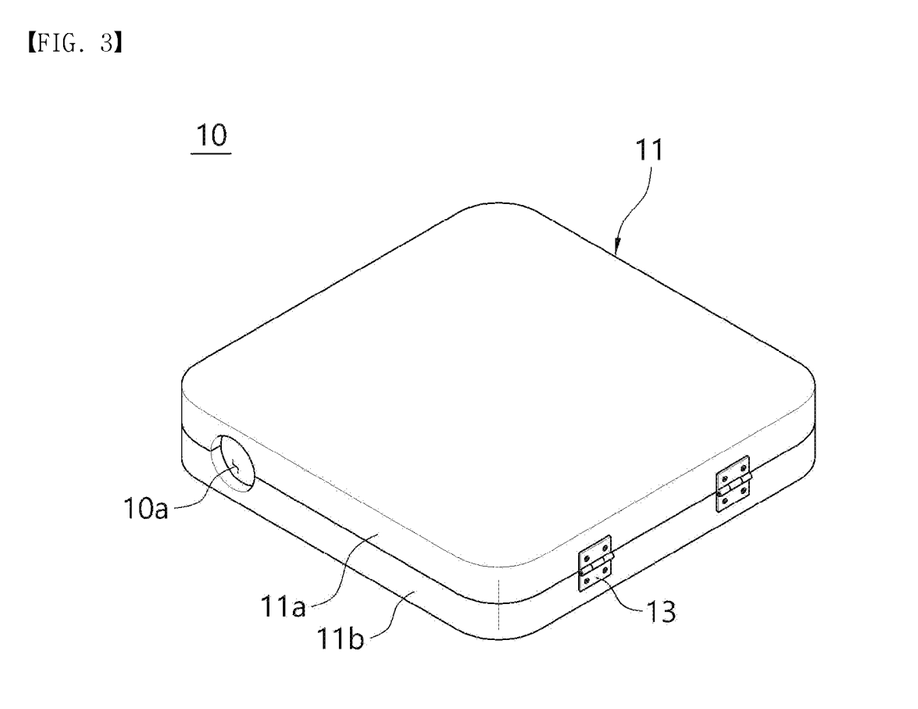
FIG. 3 is an exterior perspective view of a portable model eye apparatus for intraocular lens evaluation according to an exemplary embodiment of the present invention.

FIG. 3 shows an exterior perspective view of a portable model eye apparatus 10 for intraocular lens evaluation according to an exemplary embodiment of the present invention. The upper case 11a and lower case 11b are closed and capable of taking pictures. A light source entrance 10a through which a light source is incident is formed in the case 11, and a beam splitter 30 is disposed behind the light source entrance 10a. The upper and lower cases 11a and 11b are connected by a hinge 13 and can be opened and closed by rotating around the hinge, and in the open state, the positions of each component, for example, the corneal module 60 and the intraocular lens modules 20 and 50, can be adjusted and rearranged.

Figure 4:
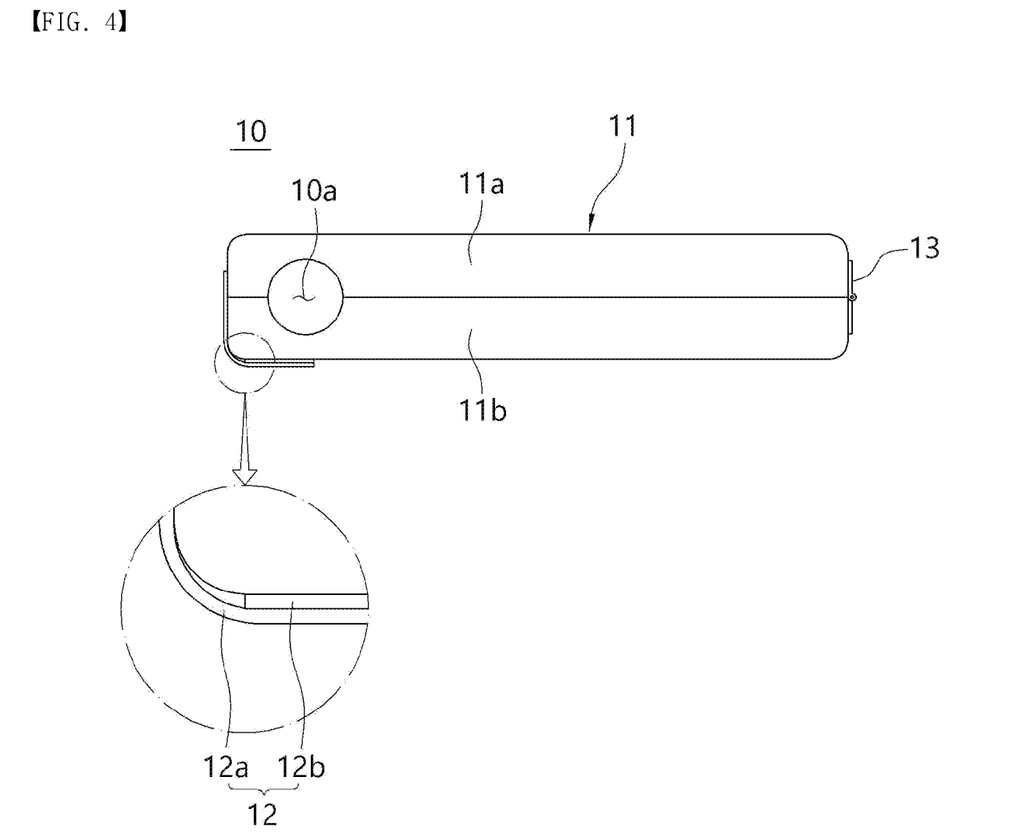
FIG. 4 is a front view of a portable model eye apparatus for intraocular lens evaluation according to an exemplary embodiment of the present invention.

Referring to FIG. 4, a front view of a portable model eye apparatus 10 for intraocular lens evaluation according to an exemplary embodiment of the present invention is shown. The light source entrance 10a is formed in the case 11, and on the other side of the hinge 13, male and female Velcro tapes 12 (12a, 12b) are provided on the upper and lower cases 11a and 11b, respectively, to maintain the closed state of the case 11. The case 11 can be opened and closed easily and quickly using the Velcro tape 12.

Referring to FIG. 5, a plan view of a lower case 11b of a portable model eye apparatus for intraocular lens evaluation according to an exemplary embodiment of the present invention is shown. The inside of the case 11 is roughly square-shaped, and the beam splitter 30 is disposed behind the light source entrance 10a. A seating part 11d is formed in a right angle direction with respect to the beam splitter 30, and a slot 11c is formed in each of the seating parts 11d. The corneal module 60, the intraocular lens module 20 and 50, and the camera module 40, 70 may be arranged in order along each slot 11c. In addition, the remaining space other than the seating part 11d is made up of an electronic device part 80 so that components such as a battery or other intraocular lens module can be installed.

Referring to FIG. 6, a cross-sectional view taken along line AA shown in FIG. 5 is shown. The stopper 90 is inserted and fixed through the slot 11c into a fixing groove 20a formed in the main body of the intraocular lens module 20. The stopper 90 is in the form of a bolt and is screwed into the fixing groove 20a to fix the intraocular lens module 20. This method can also be applied to corneal modules. Of course, the camera module is fixed and does not need to be relocated.

Figure 7:
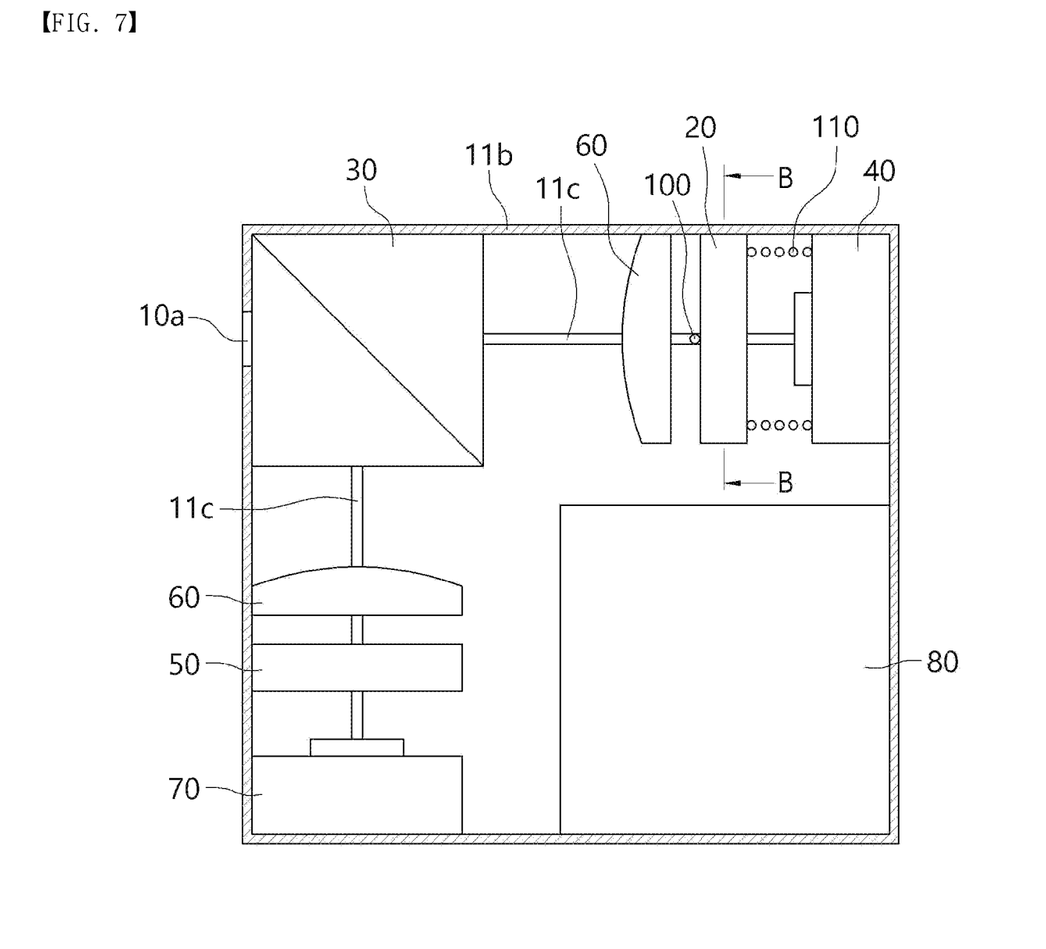
FIG. 7 is a plan view of a lower case of a portable model eye apparatus for intraocular lens evaluation according to another exemplary embodiment of the present invention.
Figure 8:
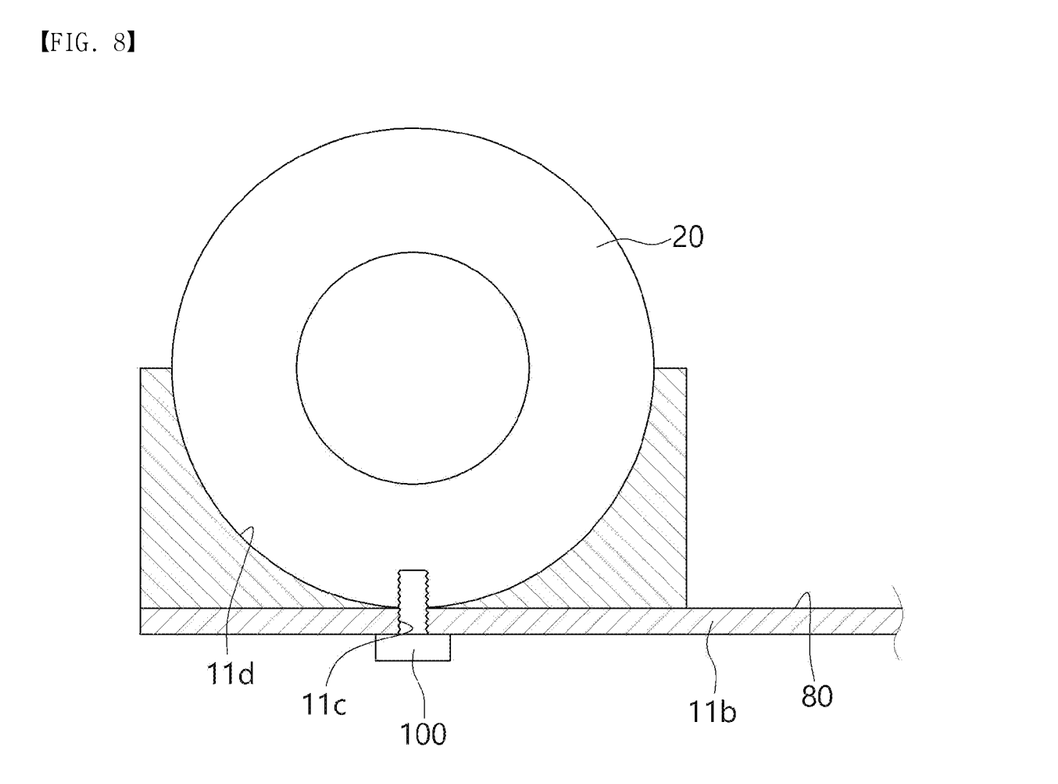
FIG. 8 a cross-sectional view taken along line BB shown in FIG. 5.

Meanwhile, referring to FIG. 7, a plan view of a lower case 11b of a portable model eye apparatus 10 for intraocular lens evaluation according to another exemplary embodiment of the present invention is shown, and FIG. 8 shows a cross-sectional view taken along line BB shown in FIG. 5. Here, an elastic means 110 may be installed between the pair of camera modules 40 and 70 and the pair of intraocular lens modules 20 and 50, and the stopper 100 may be installed on the opposite side of the elastic means 110 so that the main body of the pair of intraocular lens modules 20 and 50 are respectively caught and stopped. That is, the stopper 100 is not inserted into the intraocular lens module 20 and 50 to fix the position, but may fix the intraocular lens module 20 and 50 in a desired position in response to the elastic force of the spring, which is the elastic means 110. By doing this, there is no need to form fixing grooves in the intraocular lens modules 20 and 50, and various intraocular lens modules can be applied directly.

As such, since the portable model eye apparatus for intraocular lens evaluation is mounted inside the case, by carrying it around, one can compare intraocular lenses by photographing them in various environments.

Although exemplary embodiments of the present invention have been described, the idea of the present invention is not limited to the embodiments set forth herein. Those of ordinary skill in the art who understand the idea of the present invention may easily propose other embodiments through supplement, change, removal, addition, etc. of elements within the same idea, but the embodiments will be also within the idea scope of the present invention.

DESCRIPTION OF SYMBOLS

| | |
|---|---|
| 1: object | 20, 50: intraocular lens module |
| 10: portable model eye apparatus for intraocular lens evaluation | 40, 70: camera module |
| | 80: electronic device part |
| 11: case | |
| 30: beam splitter | |
| 60: corneal module | |
| 90, 110: stopper | |

What is claimed is:

1. A portable model eye apparatus for intraocular lens evaluation, comprising:
    a beam splitter configured to split incident light into a first emission direction and a second emission direction at right angles;
    a pair of corneal modules comprising a first corneal module disposed in the first emission direction and a second corneal module disposed in the second emission direction;
    a pair of intraocular lens modules comprising a first intraocular lens module disposed behind the first corneal module along the first emission direction and a second intraocular lens module disposed behind the second corneal module along the second emission direction;
    a pair of camera modules, comprising a first camera module disposed behind the first intraocular lens module and a second camera module disposed behind the second intraocular lens modules, that capture images formed through the pair of intraocular lens modules; and
    upper and lower cases configured to accommodate the beam splitter, the pair of intraocular lens modules, and the pair of camera modules such that the first intraocular lens module and the first camera module are arranged along the first emission direction from the beam splitter and the second intraocular lens module and the second camera module are arranged along the second emission direction from the beam splitter wherein
    the upper and lower cases include seating parts extending in the first emission direction and the second emission direction,
    the seating parts each include a slot, and
    a stopper, configured to fix a position of a corresponding one of the pair of intraocular lens modules, is installed in each of the slots and partially inserted into a main body of the corresponding one to fix the position.

2. The portable model eye apparatus for intraocular lens evaluation of claim 1, wherein intraocular lenses of the first intraocular lens module and the second intraocular lens module have different powers.

3. The portable model eye apparatus for intraocular lens evaluation of claim 1, wherein each of the pair of intraocular lens modules comprises:
    the main body having a through hole formed therein;
    an intraocular lens mounted to be fixed an inside of the through hole of the main body;
    a pair of window members respectively fixed at upper and lower ends of the through hole of the main body such that the inside of the through hole of the main body is sealed, and made of a transparent material;
    a fixing part that fixes the position of the intraocular lens; and
    an aqueous liquid filled inside the through hole.

4. The portable model eye apparatus for intraocular lens evaluation of claim 3, wherein a cross-section of the through hole is formed in a circular shape.

5. The portable model eye apparatus for intraocular lens evaluation of claim 4, wherein a central axis of the intraocular lens is disposed on a central axis of the through hole.

6. The portable model eye apparatus for intraocular lens evaluation of claim 4, wherein the fixing part comprises an upper fixing adapter and a lower fixing adapter installed on upper and lower parts of the intraocular lens to fix the intraocular lens at a certain height inside the through hole.

7. The portable model eye apparatus for intraocular lens evaluation of claim 6, wherein an assembling jaw having a reduced diameter is formed at a lower end of the through hole of the main body, and the lower fixing adapter, the intraocular lens, and the upper fixing adapter are sequentially stacked over the assembling jaw.

8. The portable model eye apparatus for intraocular lens evaluation of claim 1, wherein an elastic means is installed between the pair of camera modules and the pair of intraocular lens modules, and the stopper is installed on an opposite side of the elastic means such that the main body of the pair of intraocular lens modules are respectively caught and stopped.

* * * * *